(12) United States Patent
Gillet et al.

(10) Patent No.: US 9,033,242 B2
(45) Date of Patent: May 19, 2015

(54) MULTIPLE FOCUSABLE FIELDS OF VIEW, SUCH AS A UNIVERSAL BAR CODE SYMBOL SCANNER

(71) Applicant: Intermec IP Corp., Everett, WA (US)

(72) Inventors: Alain Gillet, Toulouse (FR); Jean-Michel Puech, Toulouse (FR); Serge Thuries, Saint Jean (FR)

(73) Assignee: Intermec IP Corp., Everett, WA (US)

( * ) Notice: Subject to any disclaimer, the term of this patent is extended or adjusted under 35 U.S.C. 154(b) by 146 days.

(21) Appl. No.: 13/802,353

(22) Filed: Mar. 13, 2013

(65) Prior Publication Data

US 2014/0084068 A1 Mar. 27, 2014

Related U.S. Application Data

(60) Provisional application No. 61/704,411, filed on Sep. 21, 2012.

(51) Int. Cl.
*G06K 7/10* (2006.01)

(52) U.S. Cl.
CPC ........ *G06K 7/10831* (2013.01); *G06K 7/10811* (2013.01)

(58) Field of Classification Search
CPC .......... G06K 7/10722; G06K 7/10811; G06K 7/10732; G06K 7/10742; G01B 11/026; G01B 11/24; G01B 9/04; F21V 13/04; G01N 2021/8908; G01N 21/8901; G03F 7/705
USPC ............ 235/462.01–462.47, 472.01, 472.02, 235/472.03
See application file for complete search history.

(56) References Cited

U.S. PATENT DOCUMENTS

| | | | | |
|---|---|---|---|---|
| 4,818,886 | A * | 4/1989 | Drucker | 250/566 |
| 5,274,243 | A * | 12/1993 | Hochgraf | 250/559.41 |
| 5,756,981 | A * | 5/1998 | Roustaei et al. | 235/462.42 |
| 7,446,885 | B2 * | 11/2008 | Zabolitzky et al. | 356/601 |
| 2006/0087660 | A1 * | 4/2006 | Zabolitzky et al. | 356/609 |

* cited by examiner

*Primary Examiner* — Thien M Le
(74) *Attorney, Agent, or Firm* — Additon, Higgins & Pendleton, P.A.

(57) ABSTRACT

A device permitting multiple focusable fields of view, such as a universal bar code scanner that can read bar code symbols at both near and far distances for a range of X-dimensions, is described. The scanner uses an adjustable optical imaging system that has at least two different focused fields of view. In one embodiment, the optimal field of view for a target object can be automatically selected with the use of a range finder.

16 Claims, 10 Drawing Sheets

MULTIPLE FOCUSABLE FIELDS OF VIEW, SUCH AS A UNIVERSAL BAR CODE SYMBOL SCANNER

CROSS-REFERENCE TO RELATED APPLICATIONS

This application claims the benefit of U.S. Provisional Application No. 60/984,863, entitled "UNIVERSAL BAR CODE SYMBOL SCANNER", filed Sep. 21, 2012, and is hereby incorporated by reference in its entirety.

BACKGROUND

Conventional bar code scanners are typically designed for either near field scanning applications or far field scanning applications. Further, conventional bar code scanners are not able to read high density and low density bar code symbols at both near field and far field. Near field scanning of bar codes generally requires a wider field of view to ensure that the entire bar code is imaged by the scanner. In contrast, far field scanning of bar codes generally requires a narrower field of view to ensure that the scanned image of the bar code has sufficient resolution.

DETAILED DESCRIPTION

Figure 1A:
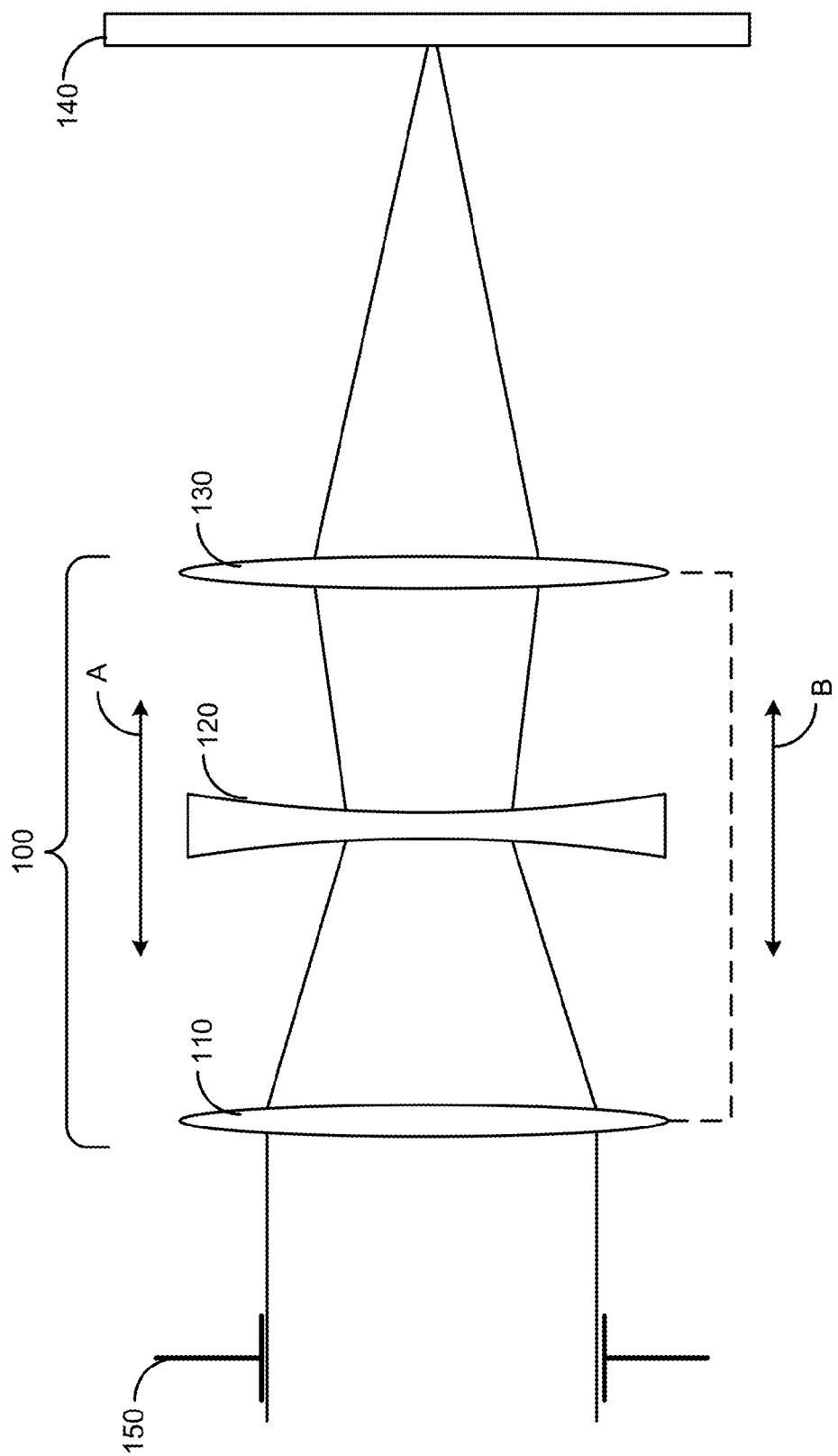
FIGS. 1A-1D depict example optical lens configurations that can be used in a universal bar code scanner.

A universal bar code scanner having multiple field of view modes is described. The system advantageously uses an adjustable lens configuration system that yields multiple focusable fields of view. The scanner can be used in conjunction with a range finder to determine an object distance, and the object distance determines a field of view mode for the scanner to use. Alternatively, the scanner can request feedback from a user or step through a series of lens positions to determine an optimal scanner mode for decoding a particular bar code symbol.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

A universal bar code symbol scanner should be capable of reading bar code symbols having a range of X-dimensions at both near and far distances. However, typically at close reading distances, a larger field of view is desirable to capture the entire bar code, especially long linear bar codes and two-dimensional matrix symbols having a large X-dimension, while at far reading distances, a smaller field of view is desirable to ensure that there is adequate resolution in the imaged symbol to allow the bar codes to be decoded.

As an example of the current state of the art, the EX25 imager engine manufactured by Intermec, Inc. of Everett, Wash., is capable of scanning a target object having an object distance that is between approximately six inches and 50 feet. However, it is not capable of scanning certain long low-density bar codes in the near field, such as is found on an AIAG (Automotive Industry Action Code) shipping label, because the imager engine has a fixed field of view (FOV) of approximately 20°, and the entire bar code is too large to fit in the field of view when imaged up close.

The techniques presented below advantageously implement adjustable optics that provide at least two different focused fields of view so that bar code symbols having a range of X-dimensions and overall symbol size are readable at both near and far distances from the bar code scanner, without the use of a continuous zoom lens.

FIGS. 1A-1D depict example optical lens configurations that can be adjusted to provide multiple focused fields of view that can be used in a universal bar code scanner.

FIG. 1A shows an example optical lens configuration 100 that includes three lens groupings 110, 120, 130. Although each of the lens groupings 110, 120, 130 is represented by a single lens in the figures, each lens grouping can include one or more lenses. In this example, lens groupings 110 and 130 have positive power, as indicated by a bi-convex lens, and lens grouping 120 has negative power, as indicated by a bi-concave lens. The lens groupings focus light reflected from a target object (not shown) to the left of FIG. 1A onto image sensor 140. Non-limiting examples of image sensors include CCD (charge coupled device) and CMOS (complementary metal oxide semiconductor) sensors.

The lens grouping 120 is movable along the optical axis, as indicated by arrow A in FIG. 1A. With three lens groupings in the optical lens configuration 100, there are two different ranges of positions to which the lens grouping 120 can be moved, where each of the ranges results in a different field of view. Within each range, adjustment of the position of the lens grouping 120 can yield a focused image of the target object on the image sensor 140. Alternatively, the two positive power lens groupings 110 and 130 can be moved together as a single unit along the optical axis, as indicated by arrow B in FIG. 1A, to two different ranges of positions that result in the same focusable fields of view for the scanner as moving the lens grouping 120. The following description will refer to movement of lens grouping 120, but also applies to movement of lens groupings 110 and 130 as a unit.

Figure 2:
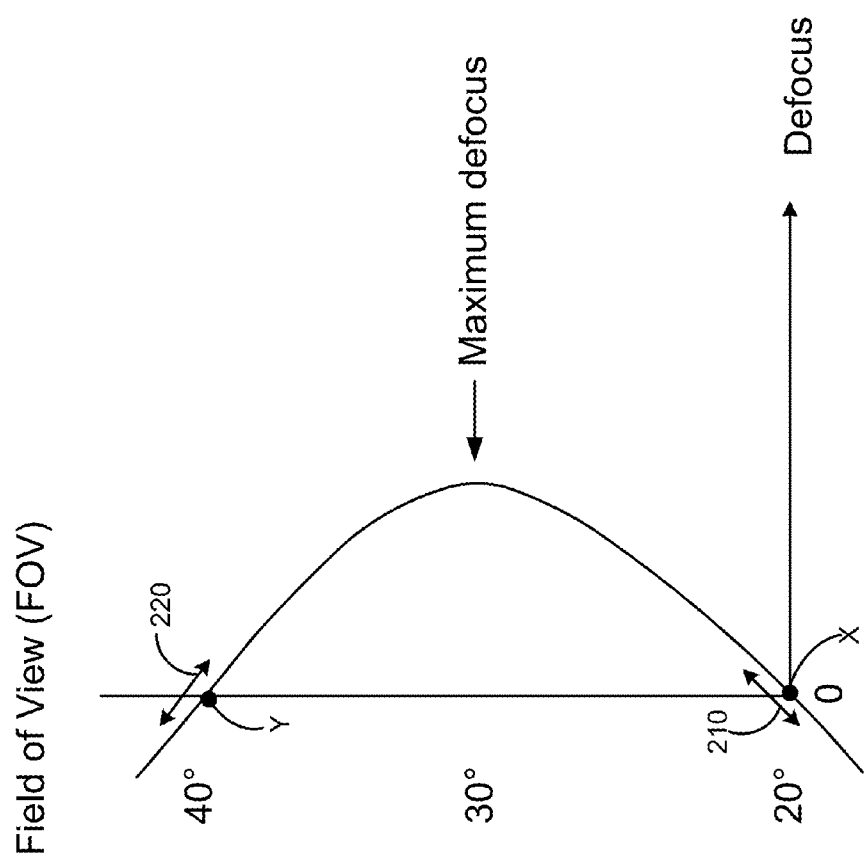
FIG. 2 depicts an example graph of defocus as a function of field of view for a universal bar code scanner.

FIG. 2 depicts an example graph of defocus as a function of field of view for the optical lens configuration shown in FIG. 1A. In this example, the lens grouping 120 can be positioned to provide a focused image having a first field of view of approximately 20° at point X, i.e., the defocus can be adjusted to zero. As the lens grouping 120 is moved in a direction that provides a larger field of view, upwards in the graph of FIG. 2, the defocus increases until a maximum defocus is reached when the field of view is approximately 30°. As the lens grouping 120 continues to be moved in the same direction, the defocus again decreases to zero at a second field of view of approximately 40°. Thus, for this lens configuration, there are two positions for the middle lens grouping 120 that results in two different focused fields of view.

The optical lens configuration 100 can be considered a partial zoom lens arrangement in which the compensator lenses used to bring intermediate fields of view (fields of view between 20° and 40° in this example) into focus are omitted. The compensator lenses allow the field of view to be changed continuously and make conventional zoom lenses complex and expensive. However, a continuously changing field of view is not necessary for a bar code scanner, only the appropriate field of view for a particular scanning environment is needed. Thus, the partial zoom lens is ideal for scanning bar codes.

The f-number of the optical lens configuration is the ratio of the focal length to the diameter of the entrance pupil. Thus, the greater the f-number for a system, the darker the image projected by the lens configuration. When the field of view is changed from, for example, 40° to 20°, the focal length of the lens configuration is doubled while the aperture remains the same, resulting in an increase of the f-number by a factor of two. The amount of light that reaches the image sensor 140 is smaller for the 20° field of view as compared to the 40° field of view. An aperture controller 150, such as an iris, can be used in conjunction with the optical lens configuration 100 to adjust the amount of light allowed to enter the scanner to ensure that approximately the same amount of light reaches the sensor 140 for different fields of view.

The smaller field of view, 20° in this example, is useful for reading bar code symbols at a farther distance from the scanner, while the larger field of view, 40° in this example, is useful for reading symbols relatively closer to the scanner. It will be evident to a person of skill in the art that the focused fields of view for a three-lens configuration can be other than 20° and 40°. For example, the focused fields of view can be 25° and 50°, or 21° and 38°.

Figure 1B:
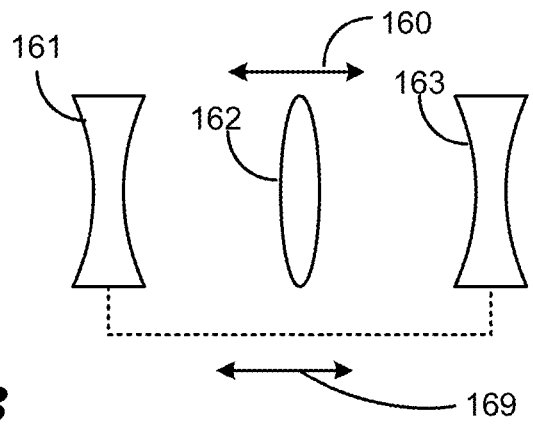
Figure 1C:
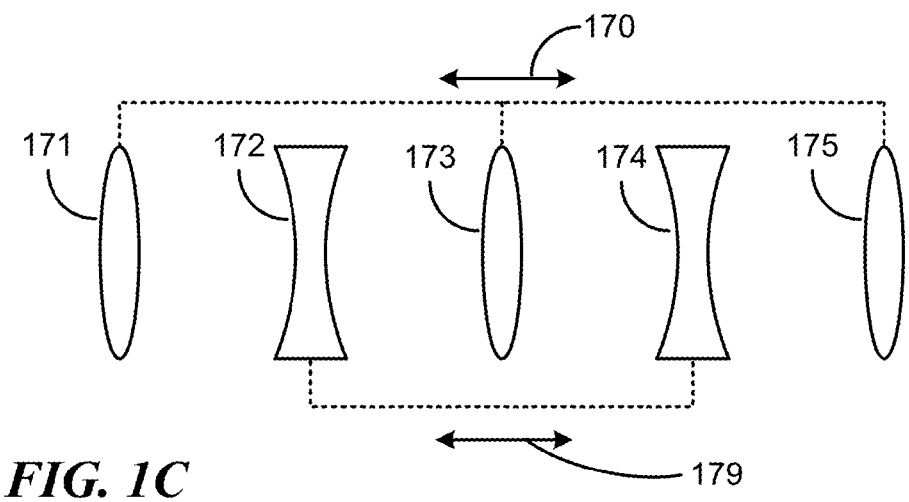
Figure 1D:
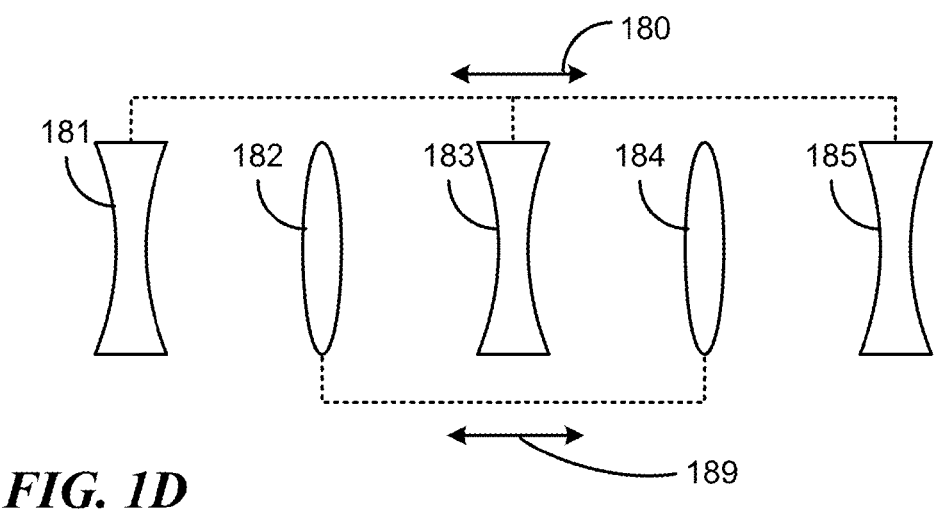

The optical lens configuration shown in FIG. 1A is one example configuration for which a lens grouping(s) can be re-positioned to yield multiple focused fields of view. FIGS. 1B-1D show other examples. FIG. 1B depicts another lens configuration with three lens groupings. In this configuration, one positive power lens grouping 162 is positioned between two negative power lens groupings 161, 163. Similar to the three lens grouping 100 shown in FIG. 1A, either the positive power lens grouping 162 can be moved along the optical axis, as indicated by arrow 160, to a different position, or the two negative power lens groupings 161, 163 can be moved as a single unit along the optical axis, as indicated by arrow 169, to obtain two different focused fields of view.

Figure 1E:
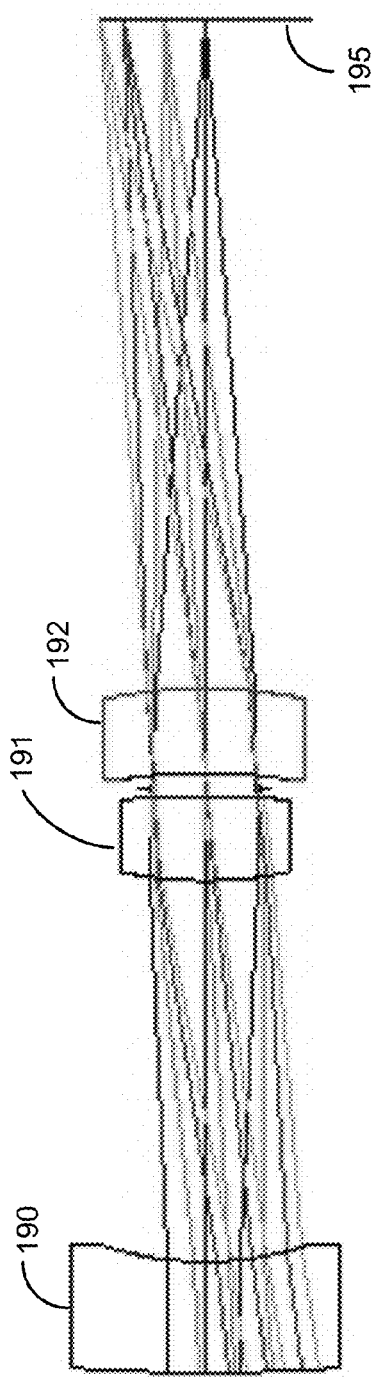
FIG. 1E depicts a ray trace diagram for an example optical lens configuration that yields a first focused field of view.
Figure 1F:
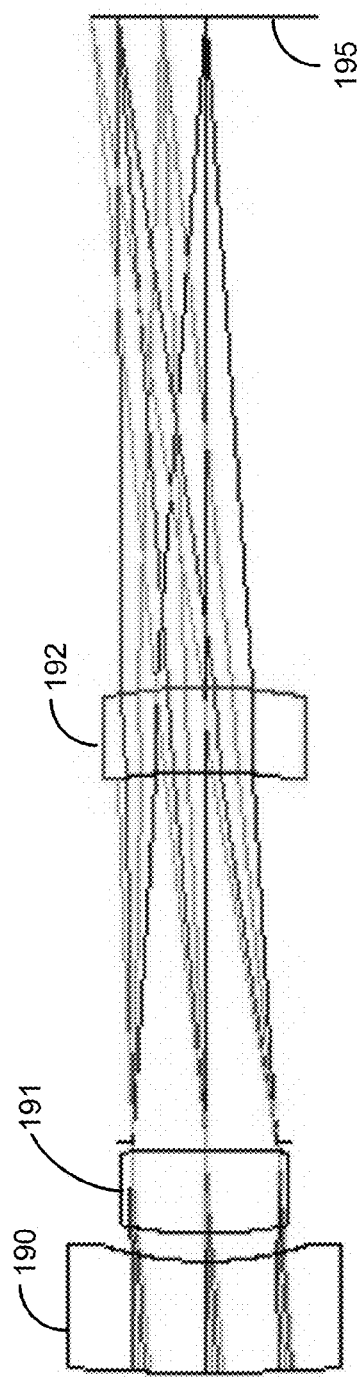
FIG. 1F depicts a ray trace diagram for the same example optical lenses as shown in FIG. 1E in a second configuration that yields a second focused field of view.

FIG. 1E depicts a ray trace diagram for an example optical lens configuration that yields a first focused field of view, and FIG. 1F depicts a ray trace diagram for the same example optical lenses shown in FIG. 1E in a second configuration that yields a second focused field of view. In both FIGS. 1E and 1F, optical lenses 190 and 192 remain fixed relative to the image sensor 195, while optical lens 191 moves from a first position in FIG. 1E to a second position in FIG. 1F that is farther from the image sensor 195.

FIGS. 1C and 1D each show a five lens configuration that can be used to provide three different focused fields of view. In FIG. 1C, two negative power lens groupings 172, 174 are positioned among three positive power lens groupings 171, 173, 175. Either the positive power lens groupings 171, 173, 175 can be moved as a unit (as indicated by arrow 170), or the negative power lens groupings 172, 174 can be moved as a unit (as indicated by arrow 179) to each of three different ranges of positions that yield three different focused fields of view. In FIG. 1D, two positive power lens groupings 182, 184 are placed among three negative power lens groupings 181, 183, 185. Similar to the five lens grouping shown in FIG. 1C, either the negative power lens groupings 181, 183, 185 can be moved as a unit (as indicated by arrow 180), or the positive power lens groupings 182, 184 can be moved as a unit (as indicated by arrow 189) to each of three different ranges of positions to obtain three different focused fields of view. A person of skill in the art will understand that many different lens configurations incorporating a different number of lens groupings can be used, where re-positioning of a single lens grouping or multiple lens groupings as a single unit results in at least two different focused fields of view.

Figure 3A:
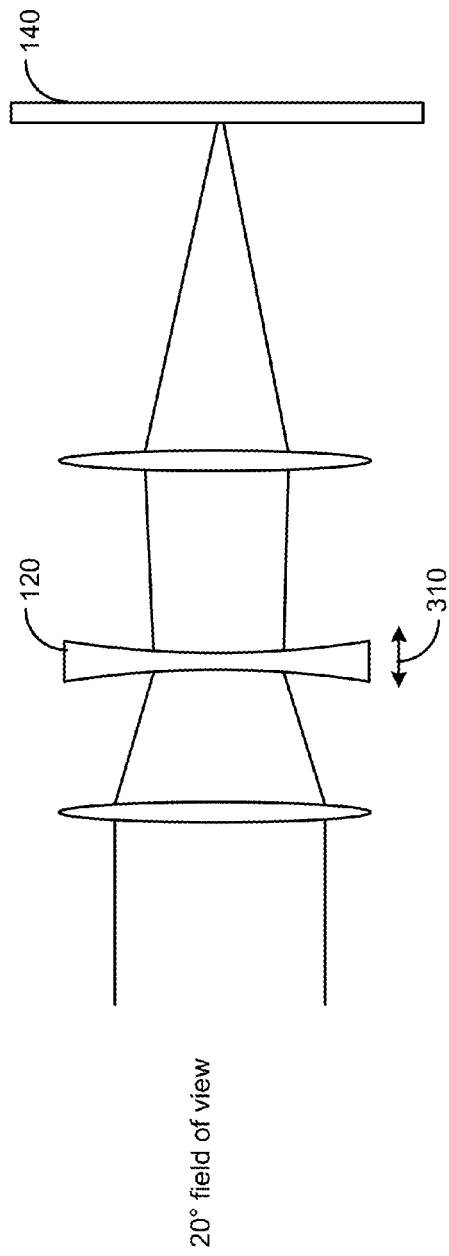
FIGS. 3A and 3B show relative lens grouping locations for two example field of view modes of a universal bar code scanner.
Figure 3B:
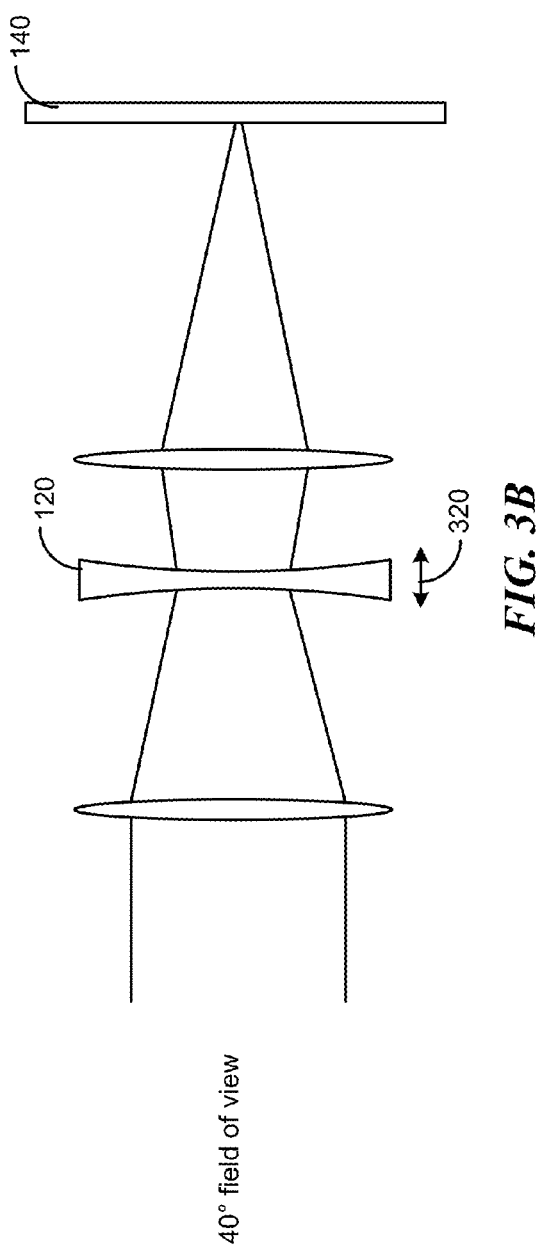

Referring back to the optical lens grouping 100 shown in FIG. 1A, FIGS. 3A and 3B show two relative locations for lens grouping 120 that yield two different fields of view for the universal bar code scanner. When the lens grouping 120 is moved closer to the object (FIG. 3A), the field of view of the scanner is smaller, for example, a 20° field of view, and when the lens grouping 120 is moved closer to the sensor 140 (FIG. 3B), the field of view of the scanner is larger, for example, a 40° field of view.

For each of the general ranges of locations for which one of the fields of view of the universal bar code scanner can be brought into focus, the lens grouping 120 can be adjusted slightly to focus the image of the target object, as shown by the arrows 310 and 320 in FIGS. 3A and 3B, respectively, without appreciably changing the field of view. Referring to the graph shown in FIG. 2, the arrow 210 near the 20° field of view at point X corresponds to the movement of the lens grouping 120 as indicated by the arrow 310 in FIG. 3A. A slight adjustment of the lens grouping 120 brings the image of a target object into focus at the sensor 140. Similarly, the arrow 220 near the 40° field of view at point Y corresponds to the movement of the lens grouping 120, as indicated by the arrow 320 in FIG. 3B, that can be used to focus an image. In the 40° field of view mode in this example, the lens grouping 120 can be slightly adjusted to focus the image of the object, as indicated by arrow 220.

Figure 4:
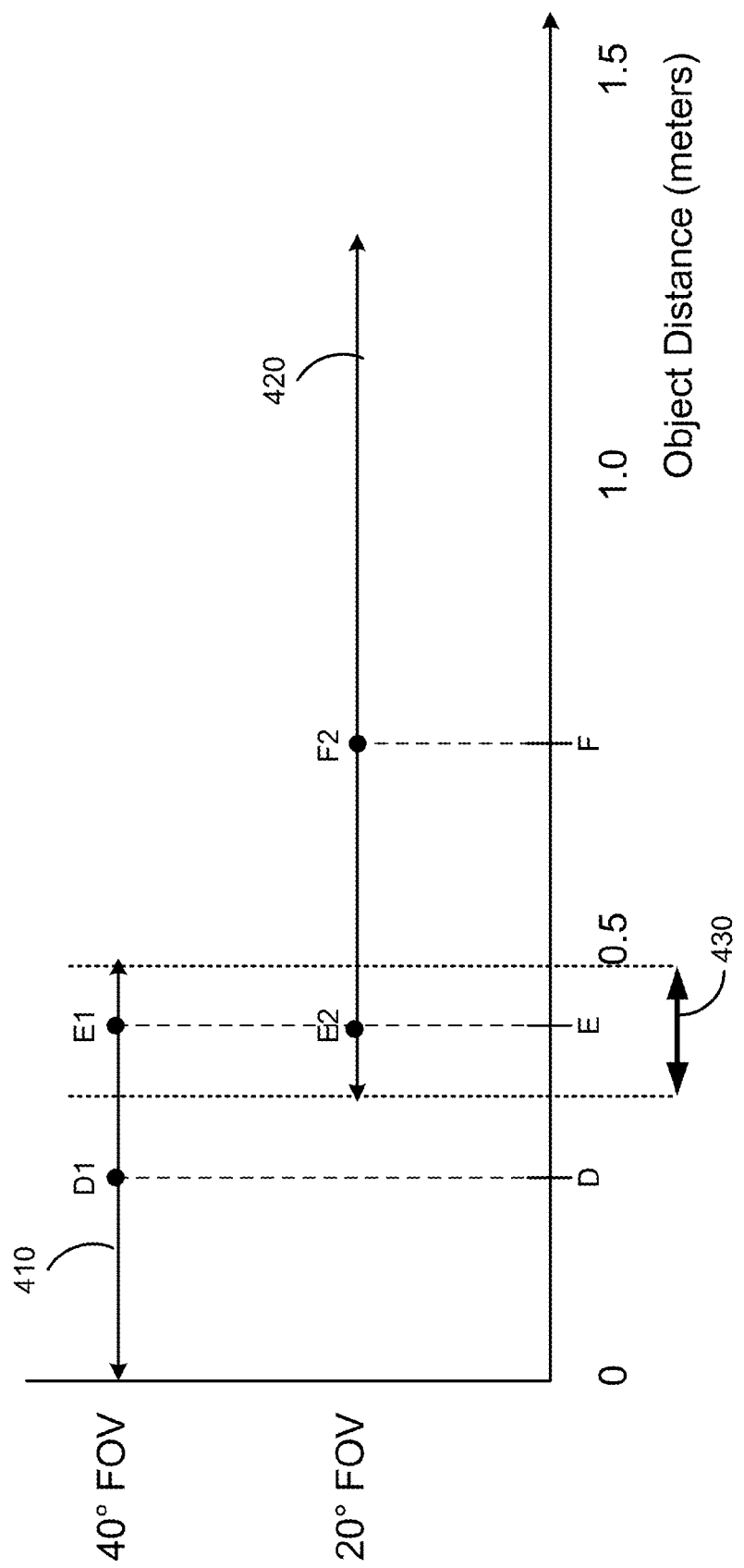
FIG. 4 is graph of example ranges of object distances for two example field of view modes of a universal bar code scanner.

FIG. 4 is a graph of example ranges of object distances from the scanner for two example field of view modes of a universal bar code scanner. For the larger field of view mode, 40° in this example, the lens configuration can be adjusted to focus a target object over a range 410 of object distances, from approximately 0 to 0.5 meters. For the smaller field of view mode, 20° in this example, the lens configuration can be adjusted to focus a target object over a range 420 of object distances from approximately 0.5 to 1.3 meters. There is an overlapping object distance range 430 for which either the larger field of view or the smaller field of view can be used to image the target object. The choice of field of view is dependent upon whether the target object is entirely captured by the field of view and whether the resolution of the imaged target is sufficient, as described below.

One example where a scanner having two (or more) focused fields of view would be advantageous is at the point of sale in a store. In this type of environment, a checkout clerk may need to scan a pack of gum up close and immediately afterward scan a bar code symbol on the side of a heavy case of water on the lower level of a shopping cart. With the above described techniques, a universal bar code scanner can scan the pack of gum at a distance of a few inches using the wider field of view. Then the scanner can shift to the narrower field of view for scanning the case of water located several feet away without having to move closer to the target.

The graph shown in FIG. 4 depicts the situation where the universal bar code scanner has two fields of view that can be brought into focus. A person of skill in the art will understand that a scanner using the above described lens configurations can have more than two focused fields of view, and that the object distances for which multiple fields of view can be brought into focus can have more than two overlapping ranges.

Figure 5:
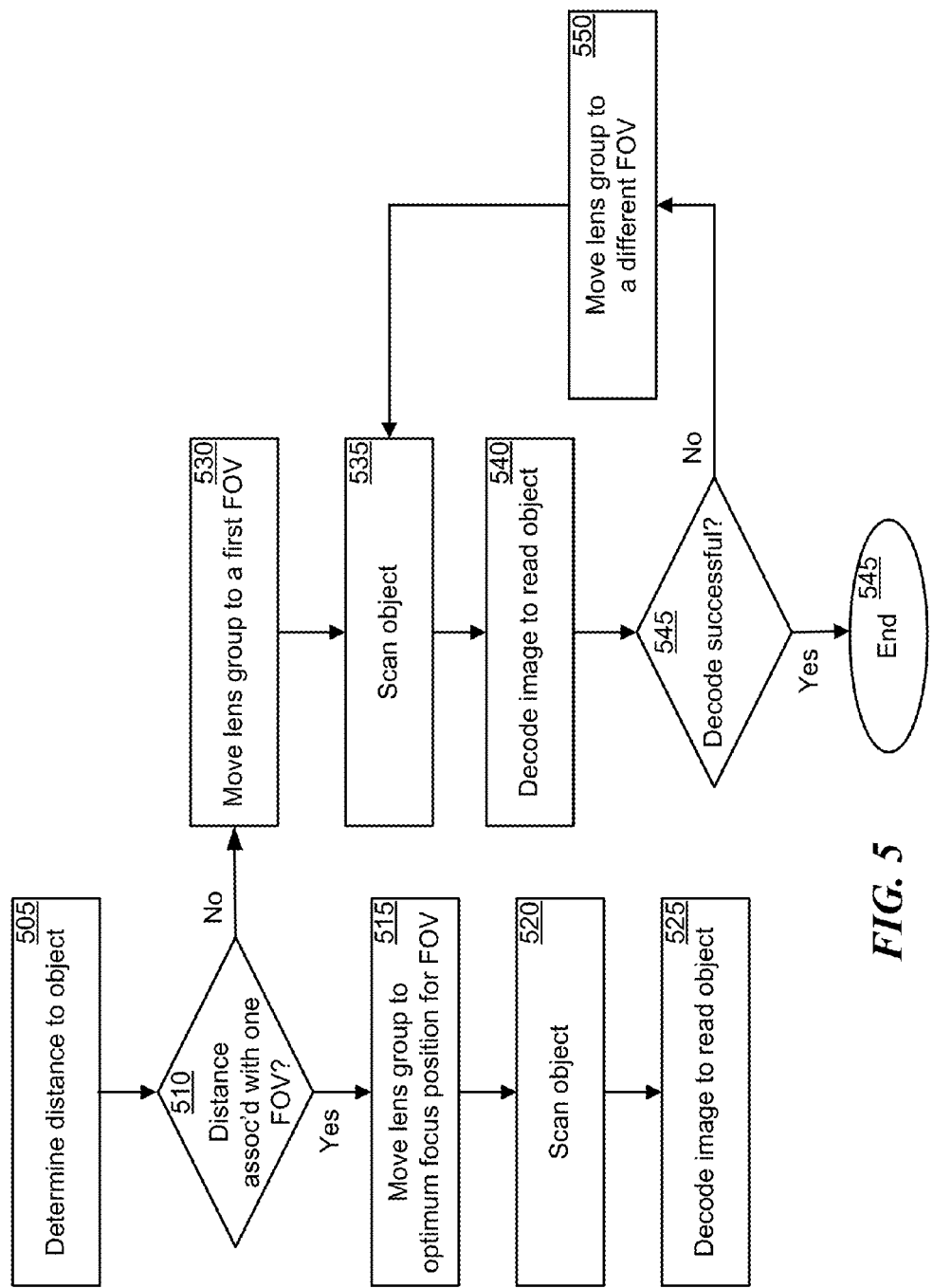
FIG. 5 is a flow diagram illustrating an example process of scanning a bar code using a scanner equipped a range finder.

If the object distance can be determined using a range finder, then the scanner can be placed in the mode having the appropriate field of view, with the use of an object distance graph, such as shown in FIG. 4. FIG. 5 is a flow diagram illustrating an example process of scanning a bar code symbol with a universal bar code scanner equipped with a range finder.

At block 505, the scanner uses a range finder to determine the object distance of the target bar code, symbol, or other object. Upon determining the object distance, at decision block 510, the scanner determines whether the distance to the object is within the range of only one of the fields of view of the scanner. If the distance is within the object distance range of only a single field of view (block 510—Yes), at block 515 the scanner moves the appropriate positionable lens group or groups to the optimum focus position for the identified field of view. For example, if the object distance is D as shown in FIG. 4, then the positionable lens group is moved directly to the position that corresponds to D1 where the scanner is operating in a 40° field of view mode. As another example, if the object distance is F, the positionable lens group is moved to the position that corresponds to F2 where the scanner is operating with a 20° field of view mode. In some cases, the scanner can use a look-up table to identify the appropriate position for the positionable lens group(s).

Then at block 520, the scanner scans the object, and at block 525 the scanner decodes the image of the object to read the object.

If the object distance falls within a range of two or more fields of view of the scanner (block 510—No), at block 530 the scanner moves the positionable lens group(s) to the optimum focus position associated with a first field of view that can produce a focused image. For example, if the object distance is E as shown in FIG. 4, both the 40° field of view mode and the 20° field of view mode of the scanner can yield a focused image of the target object. For this example, the position to which the lens groups are moved at block 530 can be selected to be either the position E1 that corresponds to the 40° field of view mode or the position E2 that corresponds to the 20° field of view mode.

Then at block 535, the scanner scans the object, and at block 540 the scanner attempts to decode the image of the object.

At decision block 545, the scanner determines whether the decoding is successful. The decoding may not be successful if the entire target object is not captured in the image, i.e. the field of view of the scanner is too narrow for the object. Alternatively, the decoding may be unsuccessful if the resolution of the image is too low to decode the symbol, i.e. the field of view of the scanner is too wide for the object. If the decoding is successful (block 545—Yes), the process ends at block 545.

If the decoding is unsuccessful (block 545—No), at block 550 the scanner moves the positionable lens group(s) to the optimum focus position associated with a second field of view that can produce a focused image. For example, if the lens group is at the position corresponding to point E1 with the larger field of view mode, the scanner moves the lens group to the position corresponding to point E2 with the smaller field of view mode, or vice versa. The process returns to block 535 to re-scan the target object.

Figure 6A:
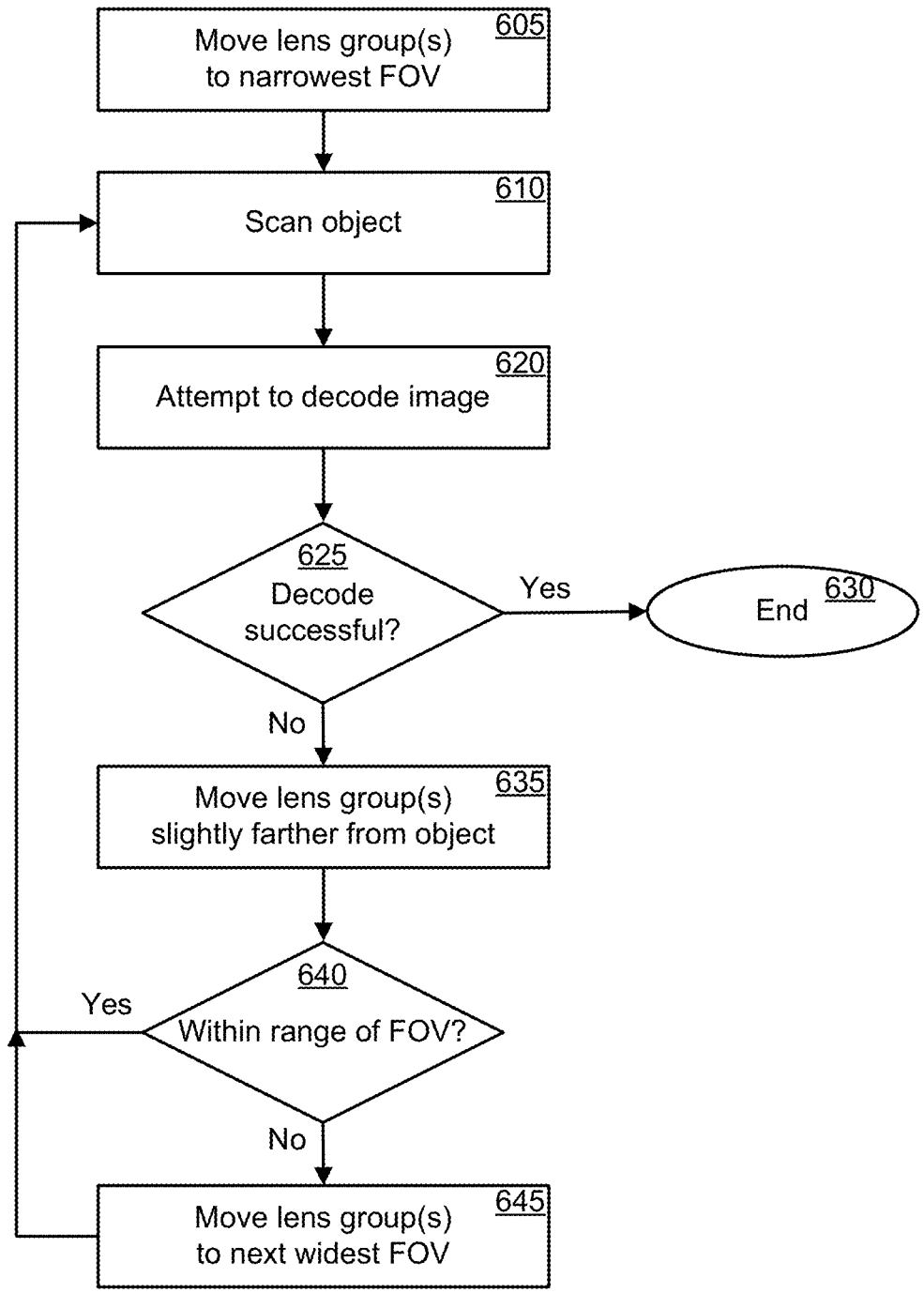
FIGS. 6A-6B are flow diagrams illustrating example processes of scanning a bar code using a scanner not equipped with a range finder.

FIG. 6A is a flow diagram illustrating an example process of scanning a bar code symbol with a universal bar code scanner not equipped with a range finder. At block 605, the scanner moves the positionable lens group(s) to the closest position from the object associated with the narrowest field of view of the scanner. The scanner can use a look-up table to determine this position. Then at block 610, the scanner scans the object and attempts to decode the acquired image at block 620.

At decision block 625, the scanner determines if the decoding is successful. If the decoding is successful (block 625—Yes), the process ends at block 630.

If the decoding is not successful (block 625—No), at block 635 the scanner moves the lens group(s) slightly farther from the object. Then at decision block 640, the scanner determines if the position of the lens group(s) yields a lens configuration that is still within the focusable range of the selected field of view. If the position of the lens group(s) is within range of the field of view (block 640—Yes), the process returns to block 610 to re-scan the symbol.

If the position of the lens group(s) is not within range (block 640—No), at block 645 the scanner moves the lens group(s) to the closest position from the object associated with the next widest field of view that the scanner is configured to operate in. Then the process returns to block 610 to scan and attempt to decode the symbol. Because the scanning and decoding process only takes a few tens of milliseconds, the time it takes to decode a symbol without a range finder is reasonable.

Figure 6B:
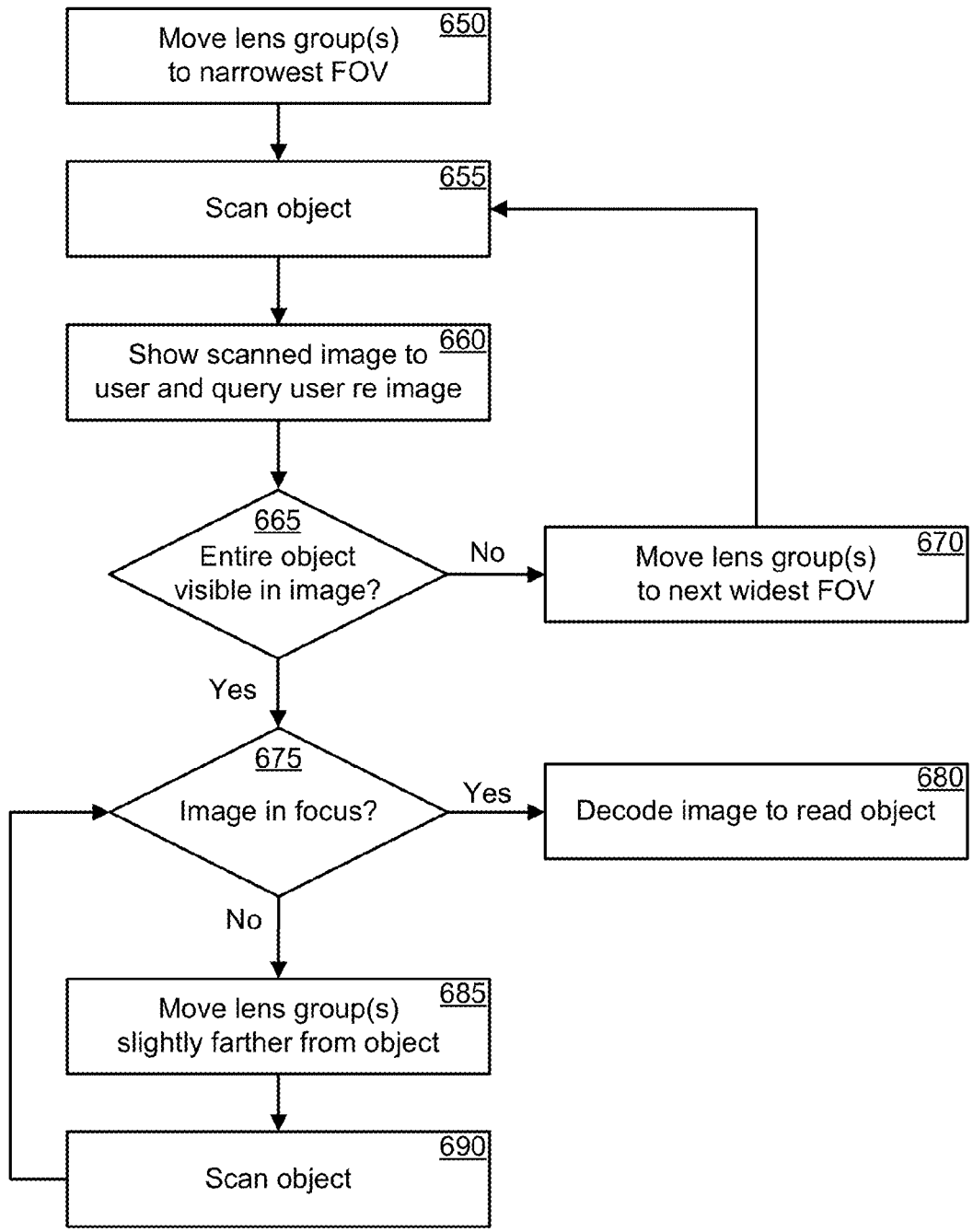

In one implementation, the scanner can request feedback from the user to determine the optimum field of view to use to decode a particular target object. FIG. 6B is a flow diagram illustrating an example process of scanning a bar code symbol with a universal bar code scanner not equipped with a range finder and requests feedback from a user. At block 650, the scanner moves the positionable lens group(s) to the closest position from the object associated with the narrowest field of view of the scanner. The scanner can use a look-up table to determine this position. Then at block 655, the scanner scans the object.

At block 660, the scanner shows the scanned image to the user and requests feedback from the user as to whether the entire object is visible in the image. If the entire object is not visible in the image (block 665—No), at block 670 the scanner moves the lens group(s) to the next widest field of view, and the process returns to block 655 to re-scan the object.

If the entire object is visible in the image (block 665—Yes), at decision block 675 the scanner determines if the image is in focus and can be decoded. If the image can be decoded (block 675—Yes), at block 680 the scanner decodes the image to read the object.

If the image is not in focus (block 675—No), at block 685 the scanner moves the lens group(s) slightly farther from the object. Then at block 690, the scanner re-scans the object, and the process returns to decision block 675 to determine whether the image is in focus.

Figure 7:
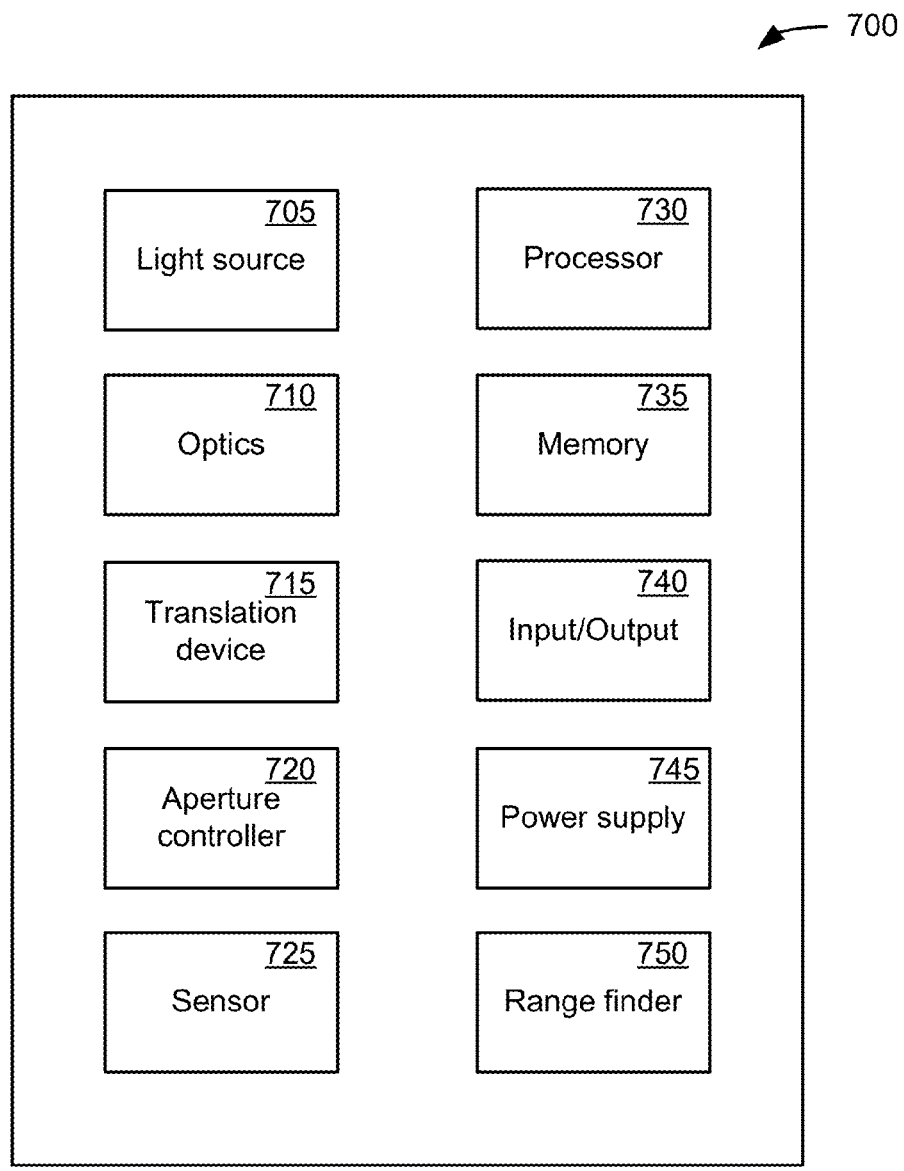
FIG. 7 shows a block diagram of a universal bar code scanner used to read bar codes having varying X-dimensions.

FIG. 7 shows a block diagram 700 of a universal bar code scanner used to read bar codes having a range of X-dimensions. A universal bar code scanner may include a light source 705, optics 710, a translation device 715, an aperture controller 720, a sensor 725, a range finder 750, one or more processors 730, one or more memory units 735, input/output devices 740, and one or more power supplies 745.

A light source 705 may be used to illuminate a bar code or symbol to be scanned, such as a laser or LED. Optics 710 may include multiple groupings of optical lenses that have positive power and negative power to focus light reflected from a bar code or symbol to a sensor 725. A translation device 715 may include, but is not limited to, a stepper motor, DC motor, and actuator for moving one or more groups of optical lenses. An aperture controller 720 may include an iris. A sensor 725 may be used to image an object, such as a CCD (charge coupled device) or CMOS (complementary metal oxide semiconductor) sensor. A range finder 750 may use, for example, radar, a laser, or sonar, to determine the distance from the scanner to a target object.

One or more processors 730 may be used to run bar code scanner applications. Memory 735 may include, but is not limited to, RAM, ROM, and any combination of volatile and non-volatile memory. An input/output device 740 may include, but is not limited to, triggers to start and stop the bar code scanner or to initiate other bar code scanner functions, visual displays, speakers, and communication devices that operate through wired or wireless communications. A power supply 745 may include, but is not limited to, a battery.

The scanner may be embodied in a handheld unit, a fixed or vehicle-mounted unit, or other bar code scanner or reader implementation. Alternatively, aspects of the present invention may be implemented in other environments, such as in mobile phones, smart phones, tablets, laptop computers, ultrabooks, personal digital assistants (PDAs), portable gaming devices, vehicle-based computers, etc.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

We claim:

1. A universal symbol scanner, the scanner comprising:
   multiple lenses configured to image light reflected from a symbol to be read,
   wherein a subset of the multiple lenses is movable to provide at least two different fields of view, and
   wherein the multiple lenses do not form a continuous zoom lens arrangement;
   a sensor configured to capture an image of the symbol;
   a processor configured to decode the captured image and control a translation device; and, the translation device coupled to the subset of the multiple lenses and responsive to the processor to move the subset of the multiple lenses along an optical axis of the multiple lenses;

wherein the multiple lenses comprise a first lens, a second lens, and a third lens, wherein the first lens has a positive power and is positioned between the second lens having a negative power and the third lens having a negative power, and further wherein the translation device is configured to move the first lens or both the second lens and the third lens responsive to the processor.

2. The scanner of claim 1, wherein the subset of the multiple lenses is moved together as a unit by the translation device, and wherein the subset of the multiple lenses is moved to at least two discrete distances by the translation device to provide two different fields of view.

3. The scanner of claim 1, wherein movement of the subset of the multiple lenses provides a different field of view or changes a focus of the image at the sensor, and further comprising an aperture controller for controlling an amount of light to impinge on the sensor.

4. The scanner of claim 1, further comprising a range finder configured to determine a distance of the symbol from the scanner, wherein the processor uses the distance to determine the movement of the subset of the multiple lenses by the translation device.

5. The scanner of claim 1, further comprising a display for displaying the captured image of the symbol, wherein the processor receives input from a user about whether the entire symbol is in the captured image to determine the movement of the subset of the multiple lenses by the translation device.

6. The scanner of claim 1, further comprising an aperture controller configured to control an amount of light reflected from the symbol that reaches the sensor, wherein the processor is further configured to control the aperture controller in conjunction with the translation device to maintain a substantially constant amount of light at the sensor.

7. A method of operating a universal symbol scanner, the method comprising:
imaging illumination reflected from a symbol using a partial zoom lens positioned to provide a first field of view, wherein one or more of multiple lenses comprising the partial zoom lens is movable to provide at least two different fields of view;
moving the one or more of the multiple lenses along an optical axis of the multiple lenses to an optimum focus position for the first field of view;
decoding the symbol;
if the decoding is unsuccessful, moving the one or more of the multiple lenses along the optical axis to provide a focused second field of view and decoding the symbol;
wherein the partial zoom lens comprises a first lens, a second lens, and a third lens, wherein the first lens has a positive power and is positioned between the second lens having a negative power and the third lens having a negative power, and further wherein moving the one or more of the multiple lenses comprises moving the first lens or both the second lens and the third lens as a unit.

8. The method of claim 7, further comprising determining a distance between the symbol and the scanner, wherein movement of the one or more of the multiple lenses is based on the determined distance.

9. The method of claim 7, further comprising controlling an amount of light reaching an imaging sensor to maintain a substantially constant amount of light at the imaging sensor when the one or more of the multiple lenses are moved.

10. A method of operating a universal bar code scanner with user feedback, the method comprising:
imaging illumination reflected from a bar code using multiple lenses, wherein at least one of the multiple lenses is movable to provide multiple fields of view;
shifting the at least one of the multiple lenses along an optical axis of the multiple lenses to provide a first field of view;
capturing an image of the bar code with a sensor;
providing to the user information regarding the captured image;
receiving feedback from the user following the providing of the information regarding the captured image;
shifting the at least one of the multiple lenses along the optical axis to provide a second field of view,
wherein the first field of view is a narrowest of the multiple fields of view and the second field of view is a wider field of view than the first field of view, or
wherein the first field of view is the widest of the multiple fields of view and the second field of view is a narrower field of view than the first field of view; and
wherein the multiple lenses comprise a first lens, a second lens, and a third lens, wherein the first lens has a positive power and is positioned between the second lens having a negative power and the third lens having a negative power, and further wherein the translation device is configured to move the first lens or both the second lens and the third lens responsive to the processor.

11. The method of claim 10, further comprising shifting the one or more of the multiple lenses until the captured image is focused; and decoding the image.

12. The method of claim 10, further comprising adjusting an aperture controller to control an amount of light reaching the sensor to maintain a substantially constant amount of light at the sensor when the one or more of the multiple lenses are shifted.

13. The method of claim 10, further comprising querying the user regarding whether the entire bar code is visible in the captured image before receiving feedback from the user.

14. The method of claim 10, wherein the shifting comprises shifting the at least one of the multiple lenses successively to different fields of view and querying the user until the entire bar code is visible in the captured image.

15. A universal symbol scanner, the scanner comprising:
means for imaging light reflected from a symbol to provide a first field of view, wherein the means for imaging includes a plurality of lenses, and one or more of the plurality of lenses is movable to provide a plurality of fields of view;
means for re-positioning the one or more of the plurality of lenses along an optical axis of the plurality of lenses to an optimum focus position for the first field of view;
means for reading the symbol;
if the means for reading is unsuccessful reading the symbol, controlling the means for re-positioning the one or more of the plurality of lenses along the optical axis to provide a focused second field of view;
wherein the plurality of lenses comprise a first lens, a second lens, and a third lens, wherein the first lens has a positive power and is positioned between the second lens having a negative power and the third lens having a negative power, and further wherein the translation device is configured to move the first lens or both the second lens and the third lens responsive to the processor.

16. The scanner of claim 15, further comprising means for determining a distance between the symbol and the scanner, wherein re-positioning of the one or more of the plurality of lenses is based on the distance.

* * * * *